(12) United States Patent
Li (10) Patent No.: US 11,171,921 B2
(45) Date of Patent: Nov. 9, 2021

(54) METHOD FOR FORWARDING OR DROPPING A PACKET IN A VIRTUAL LOCAL AREA NETWORK AND TERMINAL DEVICE

(71) Applicant: ZTE CORPORATION, Shenzhen (CN)

(72) Inventor: Xiaolong Li, Shenzhen (CN)

(*) Notice: Subject to any disclaimer, the term of this patent is extended or adjusted under 35 U.S.C. 154(b) by 259 days.

(21) Appl. No.: 16/348,633

(22) PCT Filed: Nov. 1, 2017

(86) PCT No.: PCT/CN2017/108921
§ 371 (c)(1),
(2) Date: Oct. 21, 2019

(87) PCT Pub. No.: WO2018/086475
PCT Pub. Date: May 17, 2018

(65) Prior Publication Data
US 2020/0304468 A1    Sep. 24, 2020

(30) Foreign Application Priority Data

Nov. 9, 2016    (CN) .......................... 201610988519.4

(51) Int. Cl.
*H04L 29/06* (2006.01)
*H04L 12/46* (2006.01)
(Continued)

(52) U.S. Cl.
CPC ...... *H04L 63/0263* (2013.01); *H04L 12/4641* (2013.01); *H04L 41/0803* (2013.01);
(Continued)

(58) Field of Classification Search
CPC .... G06F 13/00; G06F 21/604; G06F 21/6218; H04L 12/24; H04L 12/26; H04L 12/28;
(Continued)

(56) References Cited

U.S. PATENT DOCUMENTS

| 8,072,984 B2 | 12/2011 | Chang |
| 2002/0085545 A1 | 7/2002 | Ku et al. |

(Continued)

FOREIGN PATENT DOCUMENTS

| CN | 1571379 | 1/2005 |
| CN | 101060449 | 10/2007 |

OTHER PUBLICATIONS

International Search Report dated Dec. 28, 2017 for International Application No. PCT/CN2017/108921, 5 pages.
(Continued)

*Primary Examiner* — Robert B Harrell
(74) *Attorney, Agent, or Firm* — Knobbe Martens Olson & Bear LLP (57) ABSTRACT

Provided are a method for forwarding or dropping a packet in a virtual local area (LAN) network and a terminal device. The method includes: duplicating Layer 2 data stream packets entering through LAN side port to each of the LAN side ports; configuring a Layer 2 firewall rule according to at least one preset virtual local area network and connectivities between the LAN side ports; and determining, according to the Layer 2 firewall rule, a Layer 2 data stream packet that needs to be forwarded or dropped in each of the at least one preset virtual local area network.

12 Claims, 3 Drawing Sheets

(51) Int. Cl.
  *H04L 12/24* (2006.01)
  *H04L 12/26* (2006.01)
  *H04L 29/08* (2006.01)

(52) U.S. Cl.
  CPC .......... *H04L 43/08* (2013.01); *H04L 63/0272* (2013.01); *H04L 67/10* (2013.01); *H04L 69/324* (2013.01); *H04L 69/325* (2013.01)

(58) Field of Classification Search
  CPC . H04L 12/46; H04L 12/4641; H04L 12/5693; H04L 29/06; H04L 29/08; H04L 41/0803; H04L 41/0896; H04L 43/08; H04L 43/026; H04L 45/00; H04L 45/50; H04L 45/16; H04L 45/26; H04L 47/10; H04L 49/00; H04L 49/90; H04L 49/101; H04L 49/251; H04L 49/351; H04L 49/901; H04L 49/3018; H04L 63/20; H04L 63/102; H04L 63/0227; H04L 63/0263; H04L 63/0272; H04L 67/00; H04L 67/10; H04L 69/324; H04L 67/02; H04L 69/325; H04W 8/06; H04Q 11/00; H04Q 11/0478
  USPC .............................................. 370/412; 726/1
  See application file for complete search history.

(56) References Cited

U.S. PATENT DOCUMENTS

2009/0122801 A1   5/2009   Chang
2012/0289237 A1*  11/2012  Howlett .................. H04W 8/06
                                                          455/450

OTHER PUBLICATIONS

Written Opinion of the International Searching Authority dated Dec. 28, 2017 for International Application No. PCT/CN2017/108921, 3 pages.

Tjernlund, "[Bridge] RFC: Simple Private VLAN impl.", downloaded from <https://lists.linuxfoundation.org/pipermail/bridge/2009-June/006542.html>—2 pages (2009).

Office Action and its English Translation of corresponding Japanese Patent Application No. 2019-524023—7 pages (dated May 26, 2020).

* cited by examiner

METHOD FOR FORWARDING OR DROPPING A PACKET IN A VIRTUAL LOCAL AREA NETWORK AND TERMINAL DEVICE

CROSS REFERENCE TO RELATED APPLICATIONS

This is a National Stage Application, filed under 35 U.S.C. 371, of International Patent Application No. PCT/CN2017/108921, filed on Nov. 1, 2017, which claims priority to Chinese patent application No. 201610988519.4 filed on Nov. 9, 2016, contents of both of which are incorporated herein by reference in their entireties.

TECHNICAL FIELD

The present application relates to the field of communications and, in particular, to a virtual local area network implementation method and a terminal device.

BACKGROUND

With the rapid development of the Internet of Things (IoT) technology, it is becoming a trend to classify different terminal devices in the IoT such that these terminal devices work in different virtual local area networks and are planned and managed in a unified way.

At present, the virtual local area network is implemented using the standard protocol 802.1Q. That is, different virtual local area network data packets are classified using the method of adding a virtual local area network (VLAN) packet header to a common packet of the Layer 2 protocol. For example, the classification is performed according to ports, MAC addresses, network layers or IP multicasts. That is, configuration and classification of the devices in different virtual local area networks is performed by using a VLAN protocol supported by all devices in the virtual local area networks.

The preceding method has limitations in practical use because not all IoT terminal devices support the 802.1Q protocol. Moreover, the preceding method is limited by flash storage space, memory and CPU efficiency, and the hardware costs of IoT devices will be greatly increased if a large amount of protocol support is added.

SUMMARY

The present disclosure provides a virtual local area network implementation method and a terminal device that are aimed to solve the problem in which IoT terminal manufacturers have no unified standardized protocol and terminal devices cannot be compatible with each other in the existing art.

To achieve the preceding objective, the present disclosure provides a virtual local area network implementation method. The method includes the following steps:

duplicating Layer 2 data stream packets entering through LAN side port to each of the LAN side ports;

configuring a Layer 2 firewall rule according to at least one preset virtual local area network and connectivities between the LAN side ports; and determining, according to the Layer 2 firewall rule, a Layer 2 data stream packet that needs to be forwarded or dropped in each of the at least one preset virtual local area network.

The step of configuring the Layer 2 firewall rule according to the at least one preset virtual local area network and the connectivities between the LAN side ports includes:

creating a virtual local area network parameter table according to the at least one preset virtual local area network and the connectivities between the LAN side ports, where the virtual local area network parameter table includes results of the connectivities between the LAN side ports; and configuring the Layer 2 firewall rule according to the virtual local area network parameter table.

The step of creating the virtual local area network parameter table according to the at least one preset virtual local area network and the connectivities between the LAN side ports includes:

acquiring connectivities between the LAN side ports in the at least one preset virtual local area network according to the at least one preset virtual local area network, indicating a connectivity between every two ports by using a preset value, and encoding preset values corresponding to the connectivities between the LAN side ports to obtain encoded values that form a parameter table and thus obtain the virtual local area network parameter table.

The step of configuring the Layer 2 firewall rule according to the virtual local area network parameter table includes:

extracting the encoded values from the virtual local area network parameter table; and configuring the Layer 2 firewall rule corresponding to each of the encoded values by using a forward chain of a Layer 2 firewall Ebtables, entering network card and exiting network card parameters, and a DROP processing command.

Before the step of duplicating the Layer 2 data stream packets entering through the LAN side ports to the each of the LAN side ports, the method further includes:

monitoring all of the data stream packets entering through the LAN side ports, and determining a data stream packet type of each of the data stream packets, where the data stream packet type includes: a Layer 3 data stream packet and a Layer 2 data stream packet.

After the step of determining the data stream packet type of the each of the data stream packets, the method further includes:

in condition that the determined data stream packet type of the each of the data stream packets is the Layer 3 data stream packet, forwarding data of the Layer 3 data stream packet according to a predetermined routing table.

The step of monitoring all of the data stream packets entering through the LAN side ports includes:

capturing all of the data stream packets entering through the LAN side ports by using a hook function of a firewall framework, where a Layer 2 firewall is configured through a user space tool of a Layer 2 firewall Ebtables.

An embodiment of the present disclosure provides a terminal device. The terminal device includes:

a duplication module, which is configured to duplicate Layer 2 data stream packets entering through LAN side port to each of the LAN side ports;

a configuration module, which is configured to configure a Layer 2 firewall rule according to at least one preset virtual local area network and connectivities between the LAN side ports; and a packet processing module, which is configured to determine, according to the Layer 2 firewall rule, a Layer 2 data stream packet that needs to be forwarded or dropped in each of the at least one preset virtual local area network.

the configuration module is further configured to create a virtual local area network parameter table according to the at least one preset virtual local area network and the connectivities between the LAN side ports, where the virtual local area network parameter table includes results of connectivities between the LAN side ports result; and to configure the Layer 2 firewall rule according to the virtual local area network parameter table.

The configuration module is further configured to acquire connectivities between the LAN side ports in the at least one preset virtual local area network according to the at least one preset virtual local area network, to indicate a connectivity between every two ports by using a preset value, and to encode preset values corresponding to the connectivities between the LAN side ports to obtain encoded values that form a parameter table and thus obtain the virtual local area network parameter table.

The configuration module is further configured to extract the encoded values from the virtual local area network parameter table; and to configure the Layer 2 firewall rule corresponding to each of the encoded values by using a forward chain of a Layer 2 firewall Ebtables, entering network card and exiting network card parameters, and a DROP processing command.

The terminal device further includes:

a packet monitoring module, which is configured to monitor all of the data stream packets entering through the LAN side ports, and to determine a data stream packet type of each of the data stream packets, where the data stream packet type includes: a Layer 3 data stream packet and a Layer 2 data stream packet.

The terminal device further includes:

an execution module, which is configured, in condition that the determined data stream packet type of the each of the data stream packets is the Layer 3 data stream packet, to forward data of the Layer 3 data stream packet according to a predetermined routing table.

The packet monitoring module is further configured to capture all of the data stream packets entering through the LAN side ports by using a hook function of a firewall framework, where the Layer 2 firewall is configured using a user space tool of a Layer 2 firewall Ebtables.

In the present disclosure, directional modification of Layer 2 packet transmission is performed through a Layer 2 firewall function inherent in a terminal device, and Layer 2 data stream packets entering through the LAN side ports are duplicated to each of the LAN side ports; a virtual local area network parameter table is created according to at least one preset virtual local area network; a Layer 2 firewall rule is configured according to the virtual local area network parameter table; a Layer 2 data stream packet that needs to be forwarded or dropped in each of the at least one preset virtual local area network is determined according to the Layer 2 firewall rule, and afterwards, the data stream packet at each LAN side port is forwarded or dropped according to a determination result. In this way, the virtual local area network function is achieved. The present disclosure achieves the virtual local area network function without increasing the hardware costs of the terminal device. For the terminal device, its compatibility with other terminal devices is improved, product competitiveness is greatly enhanced, and the problem in which IoT terminal manufacturers have no unified standardized protocol and terminal devices cannot be compatible with each other in the existing art is solved.

The implementation of the objective and the features and advantages of the functions in the present disclosure will be further described in conjunction with the embodiments and with reference to the drawings.

DETAILED DESCRIPTION

It is to be understood that the embodiments described herein are intended to explain and not to limit the present disclosure.

The solution provided in embodiments of the present disclosure is to perform directional modification on Layer 2 packet transmission through a Layer 2 firewall function inherent in a terminal device. For example, among data stream packets transmitted to different local area network (LAN) side ports, some data stream packets are dropped while others are forwarded at different LAN side ports. In this way, the virtual local area network function is achieved. Furthermore, the problem in which IoT terminal manufacturers have no unified standardized protocol and terminal devices cannot be compatible with each other in the existing art is solved.

Figure 1:
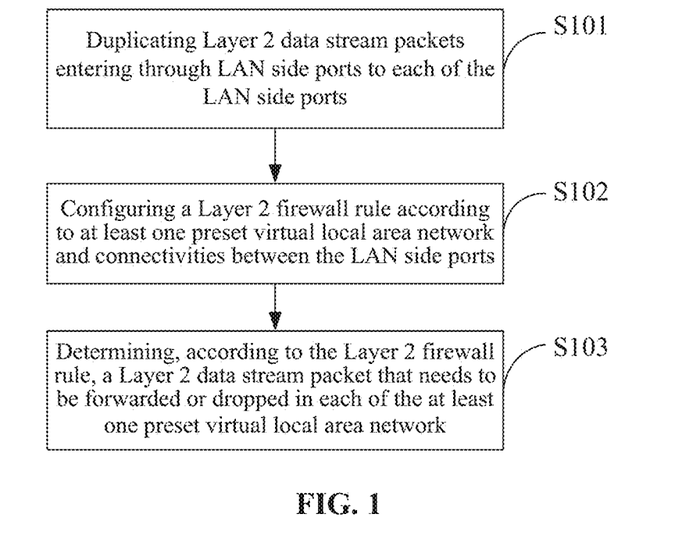
FIG. 1 is a flowchart of a virtual local area network implementation method according to an embodiment of the present disclosure.

FIG. 1 is a flowchart of a virtual local area network implementation method according to an embodiment of the present disclosure. The method is applicable to a terminal device (which refers to Customer Premise Equipment (CPE) in this embodiment). The terminal device is configured with multiple LAN side ports and a firewall framework. The firewall framework includes a Layer 2 firewall. The method includes steps S101, S102 and S103.

In S101, Layer 2 data stream packets entering through the LAN side port are duplicated to each of the LAN side ports.

All of the data stream packets entering through the LAN side ports are captured by using a hook function of the firewall framework, and Layer 2 data stream packets are selected from the captured data stream packets and then are duplicated.

Layer 2 data stream packets are based on Layer 2 protocol packets. Layer 3 data stream packets are based on Layer 3 protocol packets. Layer 2 data streams are not based on special protocols. All Layer 2 packets are based on common Layer 2 packet transmission protocols. Similarly, Layer 3 data streams refer to all Layer 3 protocol packets. Layer 3 protocols include an IP protocol and a TCP protocol.

In S102, a Layer 2 firewall rule is configured according to at least one preset virtual local area network and connectivities between the LAN side ports.

This step includes that a virtual local area network parameter table is created according to the at least one preset virtual local area network and the connectivities between the ports, where the virtual local area network parameter table includes results of the connectivities between the ports; and the Layer 2 firewall rule is configured according to the virtual local area network parameter table.

In this embodiment, a Layer 2 firewall corresponds to a Layer 2 data stream packet. In fact, the Layer 2 firewall is configured for controlling forwarding of the Layer 2 packet. Therefore, the Layer 2 firewall rule for controlling the forwarding of the Layer 2 data stream packet is configured on the basis of the Layer 2 firewall.

The at least one preset virtual local area network may be configured according to a users requirements for creation of virtual local area networks. For example, in condition that the CPE has three LAN side ports, the user requires to create three virtual local area networks VLAN1, VLAN2 and VLAN3.

In an example, when the virtual local area network parameter table is created, connectivities between ports in each preset virtual local area network are acquired according to the at least one preset virtual local area network, a connectivity between every two ports is indicated by using a binary number, and a parameter table is formed from binary numbers corresponding to the connectivities between ports. In this way, the virtual local area network parameter table is acquired.

According to the virtual local area network parameter table, the Layer 2 firewall rule is configured according to a forward chain of a Layer 2 firewall Ebtables, entering network card and exiting network card parameters, and a DROP processing command.

In S103, a Layer 2 data stream packet that needs to be forwarded or dropped in each of the at least one preset virtual local area network is determined according to the Layer 2 firewall rule.

In practical use, usually which LAN side port a packet is transmitted through is determined first. Assuming that the terminal device has four ports: LAN1, LAN2, LAN3 and LAN4 and the virtual local area networks the user need to create are VLAN1 (LAN1, LAN2, LAN3) and VLAN2 (LAN2, LAN3, LAN4), then a packet entering through LAN1 can be forwarded merely among LAN1, LAN2 and LAN3, a packet entering through LAN4 can be forwarded merely among LAN2, LAN3 and LAN4, and packets entering through LAN2 and LAN3 can be forwarded merely among LAN1, LAN2, LAN3 and LAN4.

In this embodiment, first, a virtual local area network parameter table is created according to requirements of virtual local area networks a user requires to create, then, a Layer 2 firewall rule of the Layer 2 firewall is configured according to the virtual local area network parameter table, that is, this Layer 2 firewall rule reflects the requirements of the virtual local area networks the user requires to create, and then, directional modification of Layer 2 packet transmission is performed according to this rule. In condition that two LAN side ports are located in the same virtual local area network that the user requires to create, then a Layer 2 data stream packet between the two ports is allowed to pass; otherwise, the packet is dropped and not allowed to pass. In this way, the virtual local area networks the user requires to create are created.

It is to be noted that the present disclosure does not limit the order of the preceding steps. For example, the preceding steps may be performed in the following order: S102-S101-S103.

Figure 2:
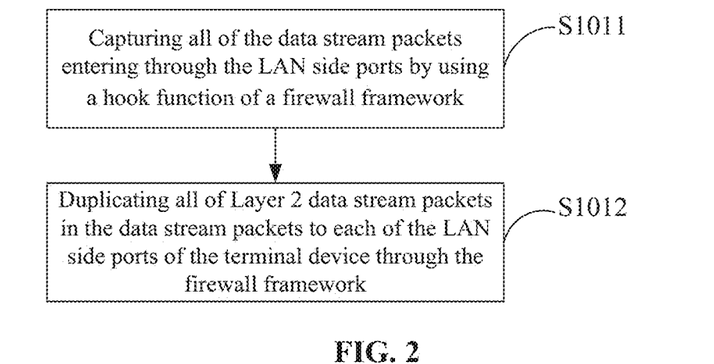
FIG. 2 is a flowchart illustrating the step of duplicating the Layer 2 data stream packets entering through the LAN side ports to each of the LAN side ports shown in FIG. 1 in detail.

In an example, referring to FIG. 2, FIG. 2 is a flowchart illustrating the step of duplicating the Layer 2 data stream packets entering through the LAN side ports to each of the LAN side ports shown in FIG. 1 in detail.

As shown in FIG. 2, in other embodiments of the virtual local area network implementation method provided in the present disclosure, the step of duplicating the Layer 2 data stream packets entering through LAN side port to each of the LAN side ports includes the steps S1011 and S1012.

In S1011, all of the data stream packets entering through the LAN side ports are captured by using a hook function of a firewall framework.

In S1012, the firewall framework duplicates all of Layer 2 data stream packets in the data stream packets to the LAN side ports of the terminal device.

In this embodiment, the preceding two steps are implemented by using the firewall framework function provided by the system, thereby reducing the workload and saving costs.

In an example, in other embodiments of the virtual local area network implementation method provided in the present disclosure, the Layer 2 firewall is configured through a user space tool of a Layer 2 firewall Ebtables.

In an example, in other embodiments of the virtual local area network implementation method provided in the present disclosure, the step of creating the virtual local area network parameter table according to the requirements of the virtual local area networks the user requires to create includes the step described below.

The connectivities between ports are obtained according to the requirements of the virtual local area networks that need to be created. A connectivity between every two ports is indicated by using a preset value. In this embodiment, connectivity between every two ports is indicated by using a binary number. Usually, 0 is used for indicating disconnection and 1 is used for indicating connection. Connection and disconnection may also be indicated by "up" and "down" respectively. In this way, a parameter table composed of binary numbers, that is, a virtual local area network parameter table, is obtained. For example, in condition that the terminal device has three LAN side ports, the user needs to create three virtual local area networks, and a binary number is used to indicate connectivities between the ports, then a three-bit binary number is used and the three bits in the three-bit binary number indicate a connectivity between the port 1 and the port 2, a connectivity between the port 1 and the port 3, and a connectivity between the port 2 and the port 3 in sequence from left to right. In condition that 1 indicates connection while 0 indicates disconnection, then the three-bit binary number 000 forms a virtual local area network parameter table indicating that the port 1 is disconnected from the port 2, the port 1 is disconnected from the port 3, and the port 2 is disconnected from the port 3. In this case, three virtual local area networks VLAN1 (port 1), VLAN2 (port 2) and VLAN3 (port 3) are created.

The step of configuring the Layer 2 firewall rule according to the virtual local area network parameter table includes the step described below According to the virtual local area network parameter table, the Layer 2 firewall rule is written according to a forward chain of a Layer 2 firewall Ebtables, entering network card and exiting network card parameters, and DROP processing command configuration.

According to the characteristics of the Layer 2 firewall Ebtables, a packet filtering table is configured. The packet filtering table contains forward forwarding chain parameters and entering network card and exiting network card parameters. When virtual local area networks are created, in condition that two ports are connected to each other, a firewall rule without DROP processing command is adopted; in condition that two ports are disconnected from each other, a firewall rule with a DROP processing command is adopted. Meanwhile, a firewall rule for port connectivity is configured for any two ports to ensure that a firewall rule is configured for these ports according to corresponding parameter table information.

In an example, when a Layer 2 firewall rule is configured, encoded values are extracted from a virtual local area network parameter table. The Layer 2 firewall rule corresponding to each of the encoded values is configured according to a forward chain of a Layer 2 firewall Ebtables, entering network card and exiting network card parameters, and a DROP processing command. That is, each encoded value corresponds to one Layer 2 firewall rule.

When a Layer 2 firewall rule is configured, in condition that the connectivity between two ports M and N is disconnection, then in a forward chain in a filtering table, DROP commands: are added. This rule is denoted by the following expression:

ebtables -t filter -A FORWARD -i ethM -o ethN -j DROP;
ebtables -t filter -A FORWARD -i ethN-o ethM -j DROP.

In this expression, filter denotes the filtering table, FORWARD denotes the forward chain, and DROP denotes the DROP command.

Each bit of an encoded value indicates a result of the connectivity between two ports. For example, for a terminal device having three ports, namely port 1, port 2 and port 3, the encoded value 000 indicates that the three ports are disconnected from each other.

The following uses an example to describe how to write a Layer 2 firewall rule. Assuming that the terminal device has three LAN side ports, namely, port 1, port 2 and port 3, then the user may create virtual local area networks in eight manners described below.

First, coding is performed. A binary number is used to indicate connectivities between the ports by way of example. A connectivity between every two ports is indicated by a binary number. In this way, binary number codes between all ports are obtained. These codes form a parameter table as a virtual local area network parameter table.

In an example, since the terminal device has three LAN side ports and a binary number is used to indicate connectivities between the ports, a three-bit binary number is used and the three bits in the three-bit binary number indicate a connectivity between the port 1 and the port 2, a connectivity between the port 1 and the port 3, and a connectivity between the port 2 and the port 3 in sequence from left to right. 1 indicates connection while 0 indicates disconnection. The following describes coding in different cases.

000: indicates that the port 1 is disconnected from the port 2, the port 1 is disconnected from the port 3, and the port 2 is disconnected from the port 3; and three virtual local area networks VLAN1 (port 1), VLAN2 (port 2) and VLAN3 (port 3) are created.

001: indicates that the port 1 is disconnected from the port 2, the port 1 is disconnected from the port 3, and the port 2 is connected to the port 3; and two virtual local area networks VLAN1 (port 1) and VLAN2 (port 2, port 3) are created.

010: indicates that the port 1 is disconnected from the port 2, the port 1 is connected to the port 3, and the port 2 is disconnected from the port 3; and two virtual local area networks VLAN1 (port 1, port 3) and VLAN2 (port 2) are created.

011: indicates that the port 1 is disconnected from the port 2, the port 1 is connected to the port 3, and the port 2 is connected to the port 3; and two virtual local area networks VLAN1 (port 1, port 3) and VLAN2 (port 2, port 3) are created.

100: indicates that the port 1 is connected to the port 2, the port 1 is disconnected from the port 3, and the port 2 is disconnected from the port 3; and two virtual local area networks VLAN1 (port 1, port 2) and VLAN2 (port 3) are created.

101: indicates that the port 1 is connected to the port 2, the port 1 is disconnected from the port 3, and the port 2 is connected to the port 3; and two virtual local area networks VLAN1 (port 1, port 2) and VLAN2 (port 2, port 3) are created.

110: indicates that the port 1 is connected to the port 2, the port 1 is connected to the port 3, and the port 2 is disconnected from the port 3; and two virtual local area networks VLAN1 (port 1, port 2) and VLAN2 (port 1, port 3) are created.

111: indicates that the port 1 is connected to the port 2, the port 1 is connected to the port 3, and the port 2 is connected to the port 3; and one virtual local area network VLAN1 (port 1, port 2, port 3) is created.

It can be seen that if the user creates virtual local area networks, the user creates the virtual local area networks in the preceding eight manners, in which at most three virtual local area networks are created and at least one virtual local area network is created.

Similarly, for a CPE product that usually has four ports as wired LAN ports, virtual local area networks are created in 64 manners, in which at most four virtual local area networks are created and at least one virtual local area network is created.

The following describes ebtables rules corresponding to the preceding examples (three LAN side ports).

i. ebtables rules for 000 coding:
ebtables -t filter -A FORWARD -i eth1 -o eth2 -j DROP
ebtables -t filter -A FORWARD -i eth2 -o eth1 -j DROP
ebtables -t filter -A FORWARD -i eth1 -o eth3 -j DROP
ebtables -t filter -A FORWARD -i eth3 -o eth1 -j DROP
ebtables -t filter -A FORWARD -i eth2 -o eth3 -j DROP
ebtables -t filter -A FORWARD -i eth3 -o eth2 -j DROP
ii. ebtables rules for 001 coding:
ebtables -t filter -A FORWARD -i eth1 -o eth2 -j DROP
ebtables -t filter -A FORWARD -i eth2 -o eth1 -j DROP
ebtables -t filter -A FORWARD -i eth1 -o eth3 -j DROP
ebtables -t filter -A FORWARD -i eth3 -o eth1 -j DROP
iii. ebtables rules for 010 coding:
ebtables -t filter -A FORWARD -i eth1 -o eth2 -j DROP
ebtables -t filter -A FORWARD -i eth2 -o eth1 -j DROP
ebtables -t filter -A FORWARD -i eth2 -o eth3 -j DROP
ebtables -t filter -A FORWARD -i eth3 -o eth2 -j DROP
iv. ebtables rules for 011 coding:
ebtables -t filter -A FORWARD -i eth1 -o eth2 -j DROP
ebtables -t filter -A FORWARD -i eth2 -o eth1 -j DROP
v. ebtables rules for 100 coding:
ebtables -t filter -A FORWARD -i eth1 -o eth3 -j DROP
ebtables -t filter -A FORWARD -i eth3 -o eth1 -j DROP
ebtables -t filter -A FORWARD -i eth2 -o eth3 -j DROP
ebtables -t filter -A FORWARD -i eth3 -o eth2 -j DROP
vi. ebtables rules for 101 coding:
ebtables -t filter -A FORWARD -i eth1 -o eth3 -j DROP
ebtables -t filter -A FORWARD -i eth3 -o eth1 -j DROP
vii. ebtables rules for 110 coding:
ebtables -t filter -A FORWARD -i eth2 -o eth3 -j DROP
ebtables -t filter -A FORWARD -i eth3 -o eth2 -j DROP
viii. ebtables rules for 111 coding:
No rules are needed.

In the solution provided in this example, directional modification of Layer 2 packet transmission is performed through a Layer 2 firewall function inherent in a terminal device, and Layer 2 data stream packets entering through the LAN side port is duplicated to each of the LAN side ports so that preparation for data forwarding is made; a virtual local area network parameter table is created according to at least one preset virtual local area network; a Layer 2 firewall rule is configured according to the virtual local area network parameter table; a Layer 2 data stream packet that needs to be forwarded or dropped in each of the at least one preset virtual local area network is determined according to the Layer 2 firewall rule, and afterwards, the data stream packet at each LAN side port is forwarded or dropped according to a determination result. In this way, the virtual local area network function is achieved. The present disclosure achieves the virtual local area network function without increasing the hardware costs of the terminal device. For the terminal device, its compatibility with other terminal devices is improved, product competitiveness is greatly enhanced, and the problem in which IoT terminal manufacturers have no unified standardized protocol and terminal devices cannot be compatible with each other in the existing art is solved.

Figure 3:
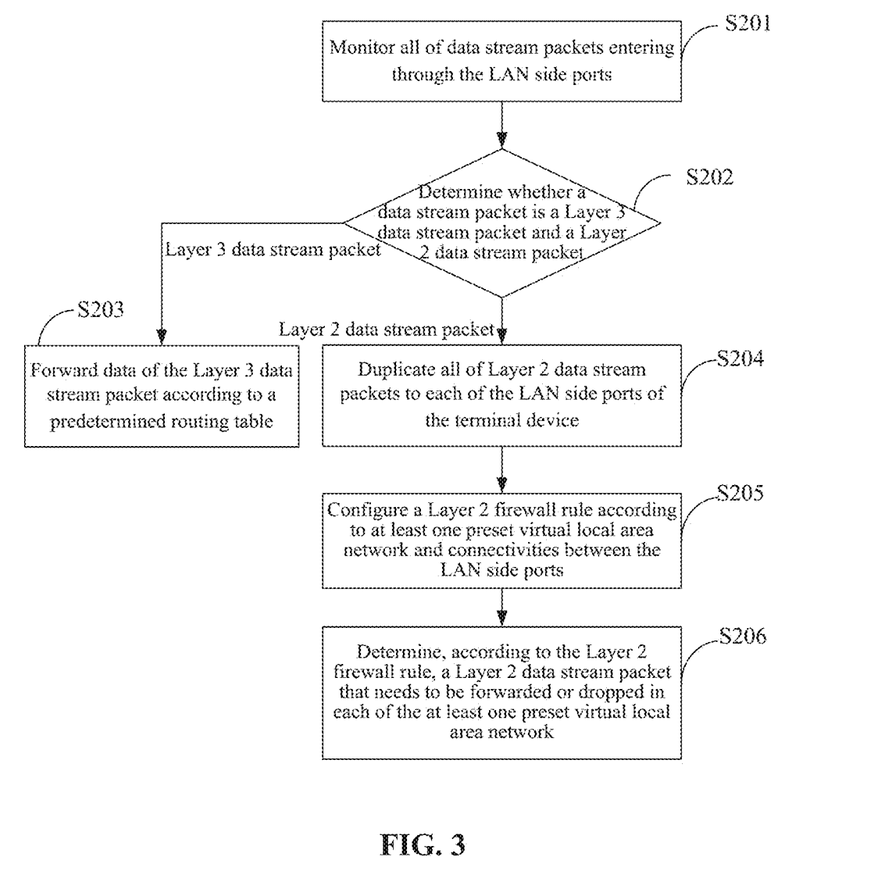
FIG. 3 is a flowchart of a virtual local area network implementation method according to an embodiment of the present disclosure.

Referring to FIG. 3, FIG. 3 is a flowchart of a virtual local area network implementation method according to an embodiment of the present disclosure.

As shown in FIG. 3, the method is applicable to a terminal device. The terminal device includes a plurality of LAN side ports and a firewall framework. The firewall framework includes Layer 2 firewalls. The method includes the steps S201 to S206.

In S201, all of data stream packets entering through LAN side ports are monitored.

In S202, a data stream packet type of each of the data stream packets is determined, where the data stream packet type includes: a Layer 3 data stream packet and a Layer 2 data stream packet, that is, whether the data stream packet is a Layer 2 data stream packet or a Layer 3 data stream packet is determined. In condition that the data stream packet is a Layer 3 data stream packet, step S203 is performed; in condition that the data stream packet is a Layer 2 data stream packet, steps S204 to S207 are performed.

In S203, data of the Layer 3 data stream packet is forwarded according to a predetermined routing table.

The predetermined routing table includes: a correspondence between the MAC address and the IP address of the current Layer 3 data stream packet, and a correspondence between the MAC address and the IP address of a next-hop Layer 3 data stream packet. The IP address corresponds to port information.

Data of the Layer 3 data stream packet is forwarded according to the routing table. That is, the Layer 3 data stream packet is normally forwarded to a corresponding port according to the IP address in the routing table.

In S204, all of Layer 2 data stream packets are duplicated to each of the LAN side ports of the terminal device so that preparation for data forwarding is made.

In S205, a Layer 2 firewall rule is configured according to at least one preset virtual local area network and connectivities between the LAN side ports.

In S206, a Layer 2 data stream packet that needs to be forwarded or dropped in each of the at least one preset virtual local area network is determined according to the Layer 2 firewall rule.

In this embodiment, first, a virtual local area network parameter table is created according to requirements of virtual local area networks a user needs to create, then, a Layer 2 firewall rule of the Layer 2 firewall is configured according to the virtual local area network parameter table, that is, this Layer 2 firewall rule reflects the requirements of the virtual local area networks the user needs to create, and then, directional modification of Layer 2 packet transmission is performed using this rule. In condition that two LAN side ports are located in the same virtual local area network that the user requires to create, then a Layer 2 data stream packet between the two ports is allowed to pass; otherwise, the packet is dropped and not allowed to pass. In this way, the virtual local area networks the user requires to create are created.

It is to be noted that compared with the virtual local area network implementation method provided in the preceding embodiment, the virtual local area network implementation method provided in this embodiment includes the step of processing a Layer 3 data stream packet.

It is to be noted that the present disclosure does not limit the order of the preceding steps. For example, the preceding steps may be performed in the following order: S205-S204-S206.

In an example, in other embodiments of the virtual local area network implementation method provided in this disclosure, all of data stream packets entering through the LAN side ports are captured by using a hook function of a firewall framework.

All of the Layer 2 data stream packets are duplicated to each of the LAN side ports of the terminal device through the firewall framework so that preparation for data forwarding is made.

In this embodiment, the preceding two steps are implemented by using the firewall framework function provided by the system, thereby reducing the workload and saving costs.

In other embodiments of the virtual local area network implementation method provided in the present disclosure, the Layer 2 firewall is configured through a user space tool of a Layer 2 firewall Ebtables.

In an example, in other embodiments of the virtual local area network implementation method provided in the present disclosure, the step of creating the virtual local area network parameter table according to the requirements of the virtual local area networks the user requires to create includes the step described below.

The connectivities between ports are obtained according to the requirements of the virtual local area networks the user requires to create, and a connectivity between every two ports is indicated by using a binary number, so that a parameter table composed of binary numbers, that is, a virtual local area network parameter table is obtained.

The step of configuring the Layer 2 firewall rule according to the virtual local area network parameter table includes:

According to the virtual local area network parameter table, the Layer 2 firewall rule is written according to a forward chain of a Layer 2 firewall Ebtables, entering network card and exiting network card parameters, and DROP processing command configuration.

How to write the Layer 2 firewall rule is as described above and will not be repeated here.

The solution in this embodiment implements separate processing of the data stream packets (including at least Layer 2 packets and Layer 3 packets) entering through LAN side ports, thereby improving the flexibility of packet processing and satisfying the requirements for implementation of virtual local area networks of Layer 2 packets. The solution in this embodiment performs directional modification of Layer 2 packet transmission by using the ebtables function that is usually provided in CPE. For example, at different ports, some packets are dropped while some packets are forwarded. In this way, the solution achieves the virtual local area network function, improves the compatibility with other terminal devices, and greatly enhances product competitiveness without increasing the hardware costs of the CPE.

Compared with the existing art, the terminal device provided in this embodiment of the present disclosure can utilize ebtables to implement the virtual local area network function for CPE LAN side ports.

802.1Q is a standardized virtual local area network protocol. In the existing art, data of different virtual local area networks is differentiated from each other by a Layer 2 VLAN header added to each data packet and then the data is forwarded. This requires all devices in the virtual local area networks to support this protocol. However, limited by CPU, memory and hardware costs, home CPE products or IoT terminals cannot all support the 802.1Q protocol. Moreover, it is impossible to make manufacturers of multiple current IoT terminal devices follow a uniform protocol standard. If adopted, the solution provided in the present disclosure will greatly improve the compatibility of the terminal device and will necessarily enhance the competitiveness of such core device as CPE in the Internet of Things.

Figure 4:
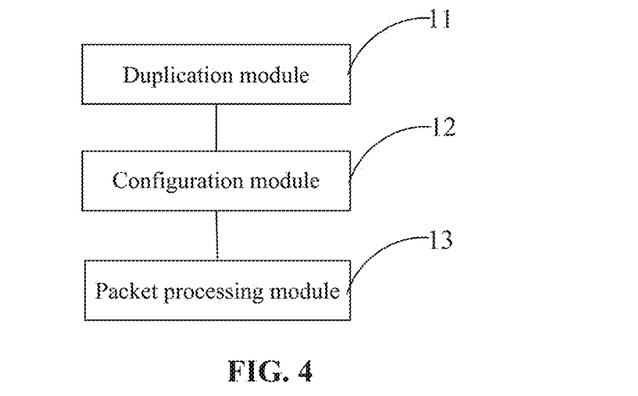
FIG. 4 is a schematic diagram of function modules in a terminal device according to an embodiment of the present disclosure.

Referring to FIG. 4, FIG. 4 is a schematic diagram of function modules in a terminal device according to an embodiment of the present disclosure.

As shown in FIG. 4, the terminal device includes a plurality of LAN side ports and a firewall framework. The firewall framework includes Layer 2 firewalls. The terminal device further includes: a duplication module 11, a configuration module 12 and a packet processing module 13.

The duplication module 11 is configured to duplicate Layer 2 data stream packets entering through the LAN side ports to each of the LAN side ports. Layer 2 data stream packets are based on Layer 2 protocol packets. Layer 3 data stream packets are based on Layer 3 protocol packets. Layer 2 data streams are not based on special protocols. All Layer 2 packets are based on common Layer 2 packet transmission protocols. Similarly, Layer 3 data streams refer to all Layer 3 protocol packets. Layer 3 protocols include an IP protocol and a TCP protocol.

The configuration module 12 is configured to configure a Layer 2 firewall rule of a Layer 2 firewall according to at least one preset virtual local area network and connectivities between the LAN side ports. This step includes that a virtual local area network parameter table is created according to the at least one preset virtual local area network and the connectivities between the LAN side ports, where the virtual local area network parameter table includes connectivities between the LAN side ports result; and the Layer 2 firewall rule is configured according to the virtual local area network parameter table.

In this embodiment, a Layer 2 firewall corresponds to a Layer 2 data stream packet. In fact, the Layer 2 firewall is configured for controlling the forwarding of the Layer 2 packet. Therefore, the Layer 2 firewall rule for controlling the forwarding of the Layer 2 data stream packet is configured on the basis of the Layer 2 firewall.

The packet processing module 13 is configured to determine a Layer 2 data stream packet that needs to be forwarded or dropped in each preset virtual local area network according to the Layer 2 firewall rule.

In an example, in other embodiments of the terminal device provided in this disclosure, the duplication module may further include:

a packet capturing unit or monitoring module, which is configured to capture all of data stream packets entering through the LAN side ports by using a hook function of the firewall framework.

The duplication module is configured to duplicate all of the Layer 2 data stream packets in the data stream packets to each of the LAN side ports of the terminal device through the firewall framework so as to prepare for data forwarding.

In other embodiments of the terminal device provided in this disclosure, the Layer 2 firewall is configured through a user space tool of a Layer 2 firewall Ebtables.

In an example, in other embodiments of the terminal device provided in this disclosure, the configuration module 12 is further configured to create a virtual local area network parameter table according to requirements of virtual local area networks a user requires to create.

That is, the configuration module 22 obtains the connectivities between the LAN side ports according to the requirements of the virtual local area networks the user requires to create, and indicates a connectivity between every two ports by using a binary number, thereby obtaining a parameter table composed of binary numbers, that is, a virtual local area network parameter table.

The configuration module 12 is further configured to configure the Layer 2 firewall rule of the Layer 2 firewall according to the virtual local area network parameter table. That is, the configuration module 22 writes the Layer 2 firewall rule according to the virtual local area network parameter table by using a forward chain of a Layer 2 firewall Ebtables, entering network card and exiting network card parameters, and DROP processing command configuration.

In the solution provided in this example, directional modification of Layer 2 packet transmission is performed through a Layer 2 firewall function inherent in a terminal device, and Layer 2 data stream packets entering through the LAN side ports are duplicated to each of the LAN side ports; a virtual local area network parameter table is created according to at least one preset virtual local area network; a Layer 2 firewall rule is configured according to the virtual local area network parameter table; a Layer 2 data stream packet that needs to be forwarded or dropped in each of the at least one preset virtual local area network is determined according to the Layer 2 firewall rule, and afterwards, the data stream packet at each LAN side port is forwarded or dropped according to a determination result. In this way, the virtual local area network function is achieved. The present disclosure achieves the virtual local area network function without increasing the hardware costs of the terminal device. For the terminal device, its compatibility with other terminal devices is improved, product competitiveness is greatly enhanced, and the problem in which IoT terminal manufacturers have no unified standardized protocol and terminal devices cannot be compatible with each other in the existing art is solved.

Figure 5:
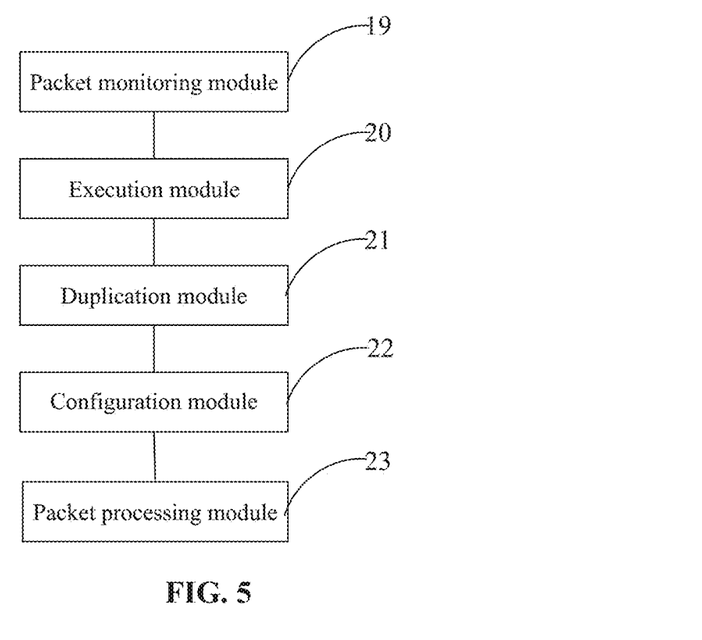
FIG. 5 is a schematic diagram of function modules in a terminal device according to an embodiment of the present disclosure.

Referring to FIG. 5, FIG. 5 is a schematic diagram of function modules in a terminal device according to an embodiment of the present disclosure.

As shown in FIG. 5, the terminal device includes a plurality of LAN side ports and a firewall framework. The firewall framework includes Layer 2 firewalls. The terminal further includes:

a packet monitoring module 19, which is configured to monitor all of data stream packets entering through the LAN side ports, and to determine a data stream packet type of each of the data stream packets, where the data stream packet type includes: a Layer 3 data stream packet and a Layer 2 data stream packet;

an execution module 20, which is configured, in condition that the determined data stream packet type of each of the data stream packets is the Layer 3 data stream packet, to forward data of the Layer 3 data stream packet according to a predetermined routing table;

a duplication module 21, which is configured to duplicate all of the Layer 2 data stream packets to each of the LAN side ports of the terminal device so as to prepare for data forwarding;

a configuration module 22, which is configured to configure a Layer 2 firewall rule of a Layer 2 firewall according to at least one preset virtual local area network and connectivities between the LAN side ports; and a packet processing module 23, which is configured to determine, according to the Layer 2 firewall rule, a Layer 2 data stream packet that needs to be forwarded or dropped in each preset virtual local area network.

In other embodiments of the terminal device provided in this disclosure, the packet monitoring module 19 captures all of the data stream packets entering through the LAN side ports by using a hook function of the firewall framework.

The duplication module 21 duplicates all of the Layer 2 data stream packets in the data stream packets to each of the LAN side ports of the terminal device through the firewall framework so as to prepare for data forwarding.

In other embodiments of the terminal device provided in this disclosure, the Layer 2 firewall is configured through a user space tool of a Layer 2 firewall Ebtables.

In other embodiments of the terminal device provided in this disclosure, the configuration module 22 is configured to create a virtual local area network parameter table according to requirements of virtual local area networks a user requires to create. That is, the configuration module 22 obtains the connectivities of ports according to the requirements of the virtual local area networks the user requires to create, and indicates a connectivity between every two ports by using a binary number, thereby obtaining a parameter table composed of binary numbers, that is, a virtual local area network parameter table.

The configuration module 22 is further configured to configure the Layer 2 firewall rule of the Layer 2 firewall according to the virtual local area network parameter table. That is, the configuration module 22 obtains the Layer 2 firewall rule according to the virtual local area network parameter table by using a forward chain of a Layer 2 firewall Ebtables, entering network card and exiting network card parameters, and DROP processing command configuration.

It is to be noted that the preceding terminal device is configured to perform each step of the preceding virtual local area network implementation method.

The solution in this embodiment implements separate processing of data stream packets (including at least Layer 2 packets and Layer 3 packets) entering through the LAN side ports, thereby improving the flexibility of packet processing and satisfying the requirements for implementation of virtual local area networks of Layer 2 packets. The solution in this embodiment performs directional modification of Layer 2 packet transmission by using the Ebtables function that is usually provided in CPE. For example, at different ports, some packets are dropped while some packets are forwarded. In this way, the solution achieves the virtual local area network function, improves the compatibility with other terminal devices, and greatly enhances product competitiveness without increasing the hardware costs of the CPE.

The preceding are merely the embodiments of the present disclosure and are not intended to limit the scope of the present disclosure. Equivalent structure or process variations made using the specification and the accompanying drawings of the present disclosure and directly or indirectly used in other existing technologies are all within the scope of the present disclosure.

INDUSTRIAL APPLICABILITY

The present disclosure is applicable to the field of communication technologies and used for achieving the virtual local area network function without increasing the hardware costs of the terminal device. Moreover, the present disclosure improves the compatibility of the terminal device with other terminal devices, greatly enhances product competitiveness, and solves the problem in which IoT terminal manufacturers have no unified standardized protocol and terminal devices cannot be compatible with each other in the existing art.

What is claimed is:

1. A method for forwarding or dropping a packet in a virtual local area network, comprising:
    duplicating Layer 2 data stream packets entering through local area network (LAN) side ports to each of the LAN side ports;
    configuring a Layer 2 firewall rule according to at least one preset virtual local area network and connectivities between the LAN side ports; and
    determining a Layer 2 data stream packet that needs to be forwarded or dropped in each of the at least one preset virtual local area network according to the Layer 2 firewall rule;
    wherein the configuring the Layer 2 firewall rule according to the at least one preset virtual local area network and the connectivities between the LAN side ports comprises: creating a virtual local area network parameter table according to the at least one preset virtual local area network and the connectivities between the LAN side ports, wherein the virtual local area network parameter table comprises results of the connectivities between the LAN side ports; and
    configuring the Layer 2 firewall rule according to the virtual local area network parameter table; and
    the creating the virtual local area network parameter table according to the at least one preset virtual local area network and the connectivities between the LAN side ports comprises:
    acquiring the connectivities between the LAN side ports in the at least one preset virtual local area network according to the at least one preset virtual local area network, indicating a connectivities between every two LAN side ports by using a preset value, encoding preset values corresponding to the connectivities between the LAN side ports to obtain encoded values that form a parameter table and thus obtain the virtual local area network parameter table.

2. The method of claim 1, wherein before the duplicating the Layer 2 data stream packets entering through the LAN side ports to the each of the LAN side ports, the method further comprises:

monitoring all of the data stream packets entering through the LAN side ports, and determining a data stream packet type of each of the data stream packets, wherein the data stream packet type comprises: a Layer 3 data stream packet and a Layer 2 data stream packet.

3. The method of claim 2, wherein after the determining the data stream packet type of the each of the data stream packets, the method further comprises:
in condition that the determined data stream packet type of the each of the data stream packets is the Layer 3 data stream packet, forwarding data of the Layer 3 data stream packet according to a predetermined routing table.

4. The method of claim 2, wherein the monitoring all of the data stream packets entering through the LAN side ports comprises:
capturing all of the data stream packets entering through the LAN side ports by using a hook function of a firewall framework, wherein a Layer 2 firewall is configured through a user space tool of a Layer 2 firewall Ebtables.

5. The method of claim 1, wherein the configuring the Layer 2 firewall rule according to the virtual local area network parameter table comprises:
extracting the encoded values from the virtual local area network parameter table; and
configuring the Layer 2 firewall rule corresponding to each of the encoded values according to a forward chain of a Layer 2 firewall Ebtables, entering network card and exiting network card parameters, and a DROP processing command.

6. The method of claim 5, wherein before the duplicating the Layer 2 data stream packets entering through the LAN side ports to the each of the LAN side ports, the method further comprises:
monitoring all of the data stream packets entering through the LAN side ports, and determining a data stream packet type of each of the data stream packets, wherein the data stream packet type comprises: a Layer 3 data stream packet and a Layer 2 data stream packet.

7. A terminal device, comprising a processor and a storage device, wherein the storage device stores processor-executable programs, and the programs comprise:
a duplication module, which is configured to duplicate Layer 2 data stream packets entering through LAN side ports to each of the LAN side ports;
a configuration module, which is configured to configure a Layer 2 firewall rule according to at least one preset virtual local area network and connectivities between the LAN side ports; and
a packet processing module, which is configured to determine a Layer 2 data stream packet that needs to be forwarded or dropped in each of the at least one preset virtual local area network according to the Layer 2 firewall rule;

wherein the configuration module is further configured to create a virtual local area network parameter table according to the at least one preset virtual local area network and the connectivities between the LAN side ports, wherein the virtual local area network parameter table comprises results of the connectivities between the LAN side ports; and to configure the Layer 2 firewall rule according to the virtual local area network parameter table; and
the configuration module is further configured to acquire the connectivities of between LAN side ports in the at least one preset virtual local area network according to the at least one preset virtual local area network, to indicate a connectivities between every two LAN ports by using a preset value, and to encode preset values corresponding to the connectivities between the LAN side ports to obtain encoded values that form a parameter table and thus obtain the virtual local area network parameter table.

8. The terminal device of claim 7, further comprising:
a packet monitoring module, which is configured to monitor all of the data stream packets entering through the LAN side ports, and to determine a data stream packet type of each of the data stream packets, wherein the data stream packet type comprises: a Layer 3 data stream packet and a Layer 2 data stream packet.

9. The terminal device of claim 8, further comprising:
an execution module, which is configured, in condition that the determined data stream packet type of the each of the data stream packets is the Layer 3 data stream packet, to forward data of the Layer 3 data stream packet according to a predetermined routing table.

10. The terminal device of claim 8, wherein the packet monitoring module is further configured to capture all of the data stream packets entering through the LAN side ports by using a hook function of a firewall framework, wherein a Layer 2 firewall is configured through a user space tool of a Layer 2 firewall Ebtables.

11. The terminal device of claim 7, wherein
the configuration module is further configured to extract the encoded values from the virtual local area network parameter table; and to configure the Layer 2 firewall rule corresponding to each of the encoded values according to a forward chain of a Layer 2 firewall Ebtables, entering network card and exiting network card parameters, and a DROP processing command.

12. The terminal device of claim 11, further comprising:
a packet monitoring module, which is configured to monitor all of the data stream packets entering through the LAN side ports, and to determine a data stream packet type of each of the data stream packets, wherein the data stream packet type comprises: a Layer 3 data stream packet and a Layer 2 data stream packet.

\* \* \* \* \*